(12) United States Patent
Maalekian et al.

(10) Patent No.: US 10,195,698 B2
(45) Date of Patent: Feb. 5, 2019

(54) LEAD-FREE HIGH RELIABILITY SOLDER ALLOYS

(71) Applicant: AIM Metals & Alloys Inc., Montreal (CA)

(72) Inventors: Mehran Maalekian, Laval (CA); Karl Seelig, Jamestown, RI (US)

(73) Assignee: AIM Metals & Alloys Inc., Montreal, QC (CA)

(*) Notice: Subject to any disclaimer, the term of this patent is extended or adjusted under 35 U.S.C. 154(b) by 16 days.

(21) Appl. No.: 15/252,347

(22) Filed: Aug. 31, 2016

(65) Prior Publication Data
US 2017/0066089 A1  Mar. 9, 2017

Related U.S. Application Data

(60) Provisional application No. 62/213,893, filed on Sep. 3, 2015.

(51) Int. Cl.
| | | |
|---|---|---|
| B23K 35/26 | (2006.01) | |
| C22C 13/00 | (2006.01) | |
| C22C 13/02 | (2006.01) | |

(52) U.S. Cl.
CPC ........... B23K 35/262 (2013.01); C22C 13/00 (2013.01); C22C 13/02 (2013.01)

(58) Field of Classification Search
CPC ........ B23K 35/262; B23K 1/00; C22C 13/00; C22C 13/02
USPC ................. 420/561, 560, 562, 557
See application file for complete search history.

(56) References Cited

U.S. PATENT DOCUMENTS

| | | | |
|---|---|---|---|
| 4,667,871 A | 5/1987 | Mizuhara | |
| 6,086,687 A | 7/2000 | Oud et al. | |
| 6,319,461 B1 * | 11/2001 | Domi | B23K 35/262 148/400 |
| 7,670,548 B2 | 3/2010 | Lee et al. | |
| 9,260,768 B2 | 2/2016 | Liu et al. | |
| 2009/0065097 A1 | 3/2009 | Chen | |
| 2012/0055586 A1 * | 3/2012 | McIsaac | B23K 1/0008 148/24 |
| 2015/0029670 A1 | 1/2015 | Ohnishi et al. | |
| 2015/0224604 A1 | 8/2015 | Choudhury et al. | |

FOREIGN PATENT DOCUMENTS

| | | |
|---|---|---|
| JP | H0845940 A | 2/1996 |
| WO | 02099146 A1 | 12/2002 |

OTHER PUBLICATIONS

Lin, Li-Wei et al., "Alloying Modification of Sn—Ag—Cu Solders by Manganese and Titanium", Microelectronics Reliability 49 (2009) 235-241, 2008 Elsevier Ltd.
Chen, W.M. et al., "Effects of Ti Addition to Sn—Ag and Sn—Cu Solders", Journal of Alloys and Compounds 520 (2012) 244-249, 2012 Elsevier B. V.
Liu, Weiping et al., "Drop Test Performance of BGA Assembly Using SAC105Ti Solder Sphere," Global SMT & Packaging—Jul. 2012, www.globalsmt.net.
Chuang, C.L. et al., "Effects of Small Amount of Active Ti Element Additions on Microstructure and Property of Sn3.5Ag0.5Cu Solder", Materials Science & Engineering A 558 (2012) 478-484, 2012 Elsevier B.V.
Sun, Lei et al., "Properties and Microstructures of Sn—Ag—Cu—X Lead-Free Solder Joints in Electronic Packagiing", Hindawi Publishing Corporation, Advances in Materials Science and Engineering, vol. 2015, Article ID639028, 16 pages, http://dx.doi.org/10.1155/2015/639028.

* cited by examiner

*Primary Examiner* — Matthew E. Hoban
*Assistant Examiner* — Lynne Edmondson
(74) *Attorney, Agent, or Firm* — Barlow, Josephs & Holmes, Ltd.

(57) ABSTRACT

A lead-free, tin-based solder alloy contains about 0.6 to about 0.8 wt % copper, about 2.8 to about 3.2 wt % silver, about 2.8 to about 3.2 wt % bismuth, about 0.5 to about 0.7 wt % antimony, about 0.04 to about 0.07 wt % nickel, and about 0.007 to about 0.015 wt % titanium, exhibits low melting temperature, narrow solidification range and undercooling, high hardness and ultimate tensile strength at room temperature and high temperature, good formability, superior reliability performance such as creep resistance at high temperature, improved thermal cycle fatigue resistance on leadless (BGA and QFN) surface mount devices, stable microstructure at high temperature, very good solderability performance, low voiding in bottom terminated components, and mitigated tin whisker growth as compared with other lead-free solder alloys

9 Claims, 15 Drawing Sheets

(15 of 15 Drawing Sheet(s) Filed in Color)

LEAD-FREE HIGH RELIABILITY SOLDER ALLOYS

CROSS-REFERENCE TO RELATED APPLICATION

This application claims priority to earlier filed U.S. Provisional Application Ser. No. 62/213,893, filed Sep. 3, 2015, the contents of which are incorporated herein by reference.

BACKGROUND OF THE INVENTION

1. Field of the Invention

The present patent document relates generally to solder alloys and more particularly to a lead-free solder alloy with high reliability under a demanding range of environments.

2. Background of the Related Art

Figure 1A:
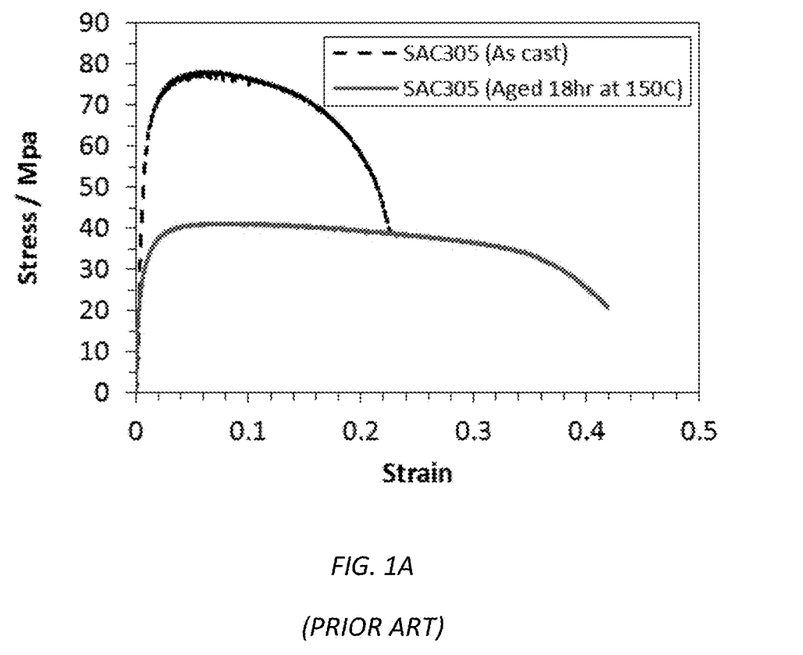
FIG. 1A is a line chart illustrating the tensile stress-strain for hardness of a prior art solder alloys, as cast and aged.
Figure 1B:
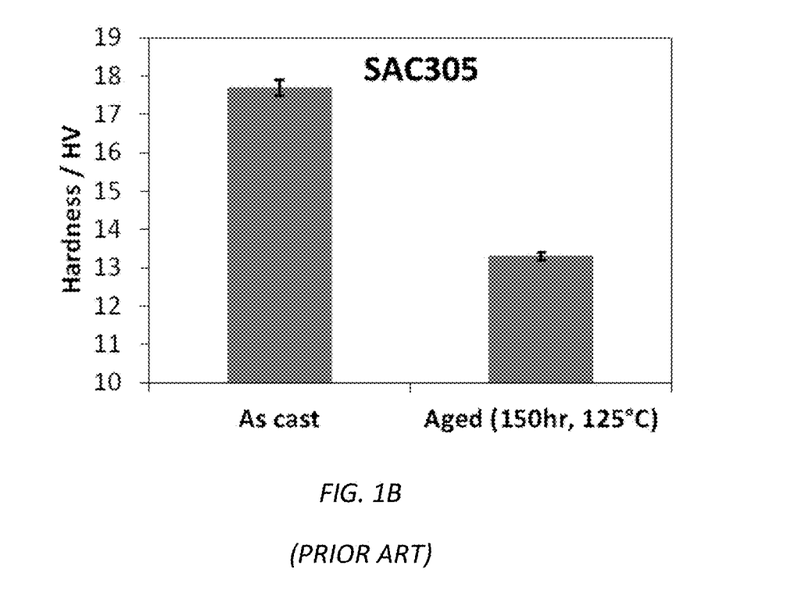
FIG. 1B is a bar chart illustrating the tensile stress-strain for a prior art solder alloys, as cast and aged.

The increasing demand for high reliability electronics drives the electronics industry to seek solders that can tolerate temperature fluctuations between cold and hot extremes. Moreover, high reliability harsh environment electronics are now being forced to change to lead free solder alloys due to commercial issues related to material supply of board finishes, component finishes that are lead free. The traditional lead-free Sn—Ag—Cu (SAC) alloys have poor creep resistance in harsh service environments. In high temperature aging, SAC alloys undergo substantial microstructure evolution which manifests itself as a change in mechanical behavior as shown in FIGS. 1A and 1B. Such a degradation of mechanical strength represents a significant problem for solder joint reliability.

The relatively high silver content of SAC305 as well as fairly high undercooling temperature range leads to the formation of large Ag3Sn platelets which gives rise to poor mechanical performance. High undercooling of SAC alloys is associated with the difficulty of nucleating Sn solidification as a pro-eutectic phase. Thus, during cooling the high undercooling of the joints can promote formation of undesirable pro-eutectic intermetallic phases, particularly Ag3Sn blade-like phase, that tend to coarsen drastically making the as-solidified solder joints brittle.

SUMMARY OF THE INVENTION

The lead-free solder alloy described herein solves the problems of the prior art by providing a lead-free solder that exhibits a comparatively lower melting temperature, better mechanical properties and high temperature creep resistance with reasonable wetting and spreading performance. The lead-free solder alloy is preferably based on Sn—Cu and Sn—Ag—Cu solder alloys.

Accordingly, a lead-free solder containing about 0.6 to about 0.8 wt % Cu, about 2.8 to about 3.2 wt % Ag, about 2.8 to about 3.2 wt % Bi, about 0.5 to about 0.7 wt % Sb, about 0.04 to about 0.07 wt % Ni, about 0.007 to about 0.015 wt % Ti, and balance Sn has been found to exhibit desirable qualities superior to prior art solders.

More preferably, the lead-free solder contains about 3 wt % Bi, about 3 wt % Ag, about 0.7 wt % Cu, about 0.6 wt % Sb, about 0.05 wt % Ni, about 0.01 wt % Ti and balance Sn, which has been found to exhibit superior resilience to heating and cooling conditions of electronics.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present invention will become better understood with reference to the following description, appended claims, and accompanying drawings where:

DESCRIPTION OF THE PREFERRED EMBODIMENT

As described above the object of the invention consists of identifying a lead-free solder alloy based on the Sn—Cu (reference to Sn-0.7Cu) and Sn—Ag—Cu (reference to SAC305) systems which exhibits a comparatively lower melting temperature, better mechanical properties and high temperature creep resistance with reasonable wetting and spreading performance.

To achieve this object the following alloy compositions (Table 1) has been studied and fine-tuned:

TABLE 1

Range of alloys composition studied.

| Elements | Cu | Ag | Bi | Sb | Ni | Ti, Ga, Zn, In | Sn |
|---|---|---|---|---|---|---|---|
| Wt % | 0-3.5 | 0-3.8 | 0-5.6 | 0-7.5 | 0-0.2 | 0-0.15 | Bal. |

Ni may increase strength through a precipitation strengthening mechanism by forming intermetallic phases with Sn. Adding Ni increases the thermal stability of an alloy due to its high melting temperature. It has also been reported to improve thermal fatigue strength. Whereas Ni-free intermetallic experiences a phase transformation around 186° C., addition of Ni stabilizes the intermetallic phase $(Cu,Ni)_6Sn_5$ down to room temperature. That is why IMC layers in Ni-free Sn—Cu solders may experience more cracking than those that contain Ni. Further, adding Ni to the Sn—Ag—Cu alloy reduces the thickness of the IMC layer after aging and also suppresses the formation of IMC $Cu_3Sn$. It has been shown that Ni improves the uniformity of the IMC layer in the as-soldered condition.

Sb is soluble in and increases strength through solid solution strengthening mechanism. It may increase the melting temperature.

Bi is soluble in Sn up to about 20 wt % and increases its strength through mainly solid solution strengthening, but decreases the melting temperature.

Minor added Ti acts as nucleant during solidification and reduces the undercooling. It is reported that Ti refines grain structure of the solder joint. It also stabilizes the morphology of solder by forming $Ti_2Sn_3$ particles and maintain the strength. Ti improves drop shock performance by refining the microstructure and suppressing formation of large $Ag_3Sn$ IMC platelets.

Micro alloying elements of Ga, Zn and In have also been investigated for potential impact on the performance of solder alloy.

Table 2 lists the solder alloys studied in this work. The alloys were prepared using an electric melting pot with a graphite crucible. Inductively coupled plasma-atomic emission spectroscopy (ICP-AES) was used to analyze the chemical composition of the alloys. Two reference alloys, SAC and SAC-I), are shown for comparison. The differential scanning calorimetry (DSC) was used to study the melting characteristics, especially to determine the onset melting temperature (solidus temperature) of each solder. Moreover, the solidification range (undercooling) that is defined as the temperature difference between melting and solidification peaks is assessed. The analysis was carried out at heating/cooling rates of 10° C./min under nitrogen atmosphere on a sample with around 20-25 mg mass. The first thermal cycle evaluates the thermal behavior in the as-cast condition; therefore, the samples were first heated to temperature of 300° C. and then cooled to room temperature. This led to erase the thermal history of the sample during casting. The second heat assessed the inherent properties of the alloy and thermal cycle provided in the second run is used to describe the melting characteristics.

TABLE 2

Some of the alloys investigated in this work.

| | Solder Composition (wt %) | | | | | | |
|---|---|---|---|---|---|---|---|
| Alloy No. | Sn | Ag | Cu | Bi | Ni | Sb | Ti, Ga, In, Zn |
| SAC305 | Bal. | 3.0 | 0.5 | — | — | — | — |
| SAC-I | Bal. | 3.6 | 0.7 | 3.2 | 0.15 | 1.6 | — |
| A | Bal. | 1.0 | 0.6 | 2.8 | — | — | 0.09 Ti |
| B | Bal. | 1.0 | 0.6 | 2.7 | — | — | 0.16 Ti |
| C | Bal. | 1.0 | 0.6 | 2.5 | — | — | 0.09 In |
| D | Bal. | 1.0 | 0.6 | 2.5 | — | — | 0.06 Ga |
| E | Bal. | 1.0 | 0.6 | 2.5 | — | 0.1 | — |
| F | Bal. | — | 0.7 | 4.0 | — | 1.6 | 0.042 Ti |
| G | Bal. | — | 0.7 | 5.6 | 0.15 | 1.6 | 0.087 Ti |
| H | Bal. | 1.0 | 0.7 | 3.3 | 0.15 | 1.6 | 0.09 Ga |
| I | Bal. | 1.0 | 0.7 | 3.6 | 0.14 | 1.6 | 0.018 Ti |

TABLE 2-continued

Some of the alloys investigated in this work.

| | Solder Composition (wt %) | | | | | | |
|---|---|---|---|---|---|---|---|
| Alloy No. | Sn | Ag | Cu | Bi | Ni | Sb | Ti, Ga, In, Zn |
| J | Bal. | 1.0 | 0.7 | 4.1 | — | 1.6 | 0.05 Ti |
| K | Bal. | 2.1 | 3.6 | — | 0.07 | 7.4 | — |
| L | Bal. | 2.9 | 0.7 | 2.9 | 0.14 | 1.6 | 0.04 Zn |
| M | Bal. | 2.9 | 0.7 | 3.1 | 0.05 | 0.6 | 0.009 Ti |
| N | Bal. | 2.8 | 0.7 | 3.9 | 0.13 | — | — |
| O | Bal. | 2.8 | 0.8 | 4.2 | 0.1 | — | 0.004 Ti |
| P | Bal. | 2.9 | 0.7 | 2.1 | — | 1.6 | 0.003 Ti |
| Q | Bal. | 3.8 | 0.6 | 3.3 | — | 1.6 | 0.004 Ti |
| R | Bal. | 2.9 | 0.7 | 2.2 | 0.16 | 1.6 | 0.003 Ti |

Figure 2:
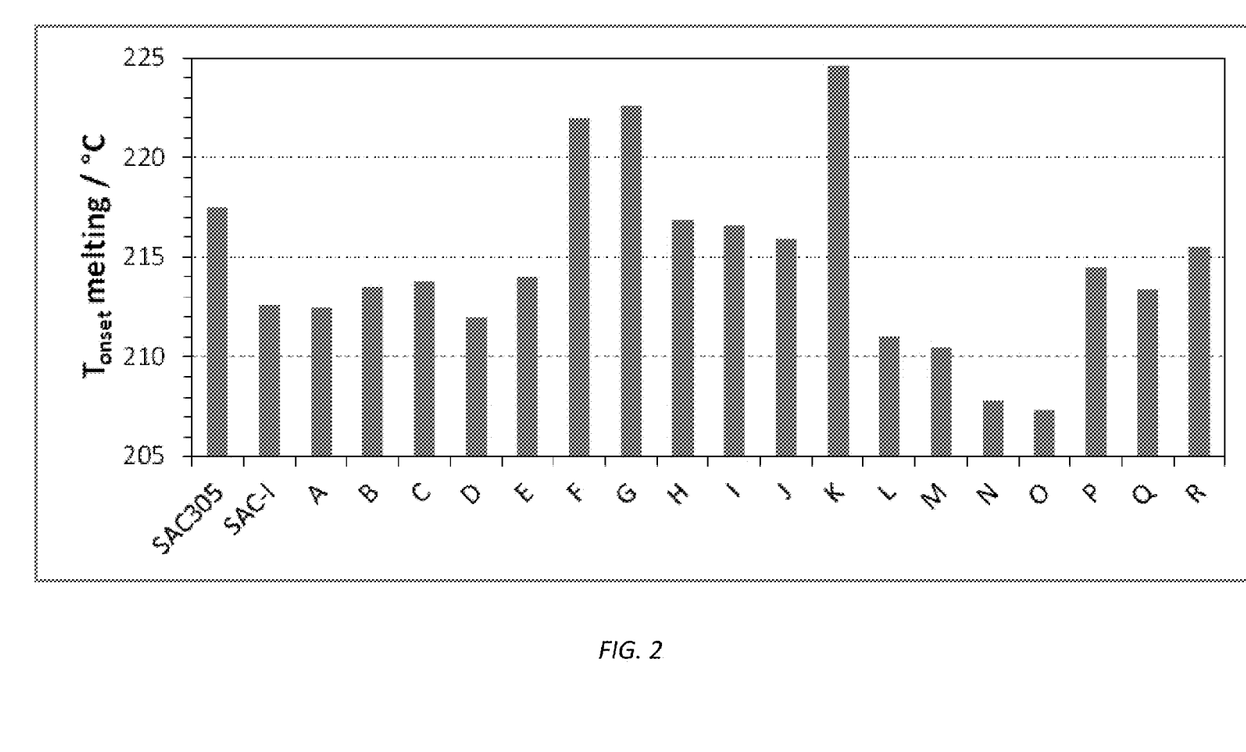
FIG. 2 is a bar chart illustrating melting temperature of prior art and experimental solder alloys.

Referring to FIG. 2, the onset melting point (solidus) of the solder obtained by alloying with Bi and Ag is significantly reduced. However, alloying with other elements studied does not lower the melting point. It is found that upon heating alloys with no or low Ag content (<2%) show two separated endothermic peaks.

Figure 3:
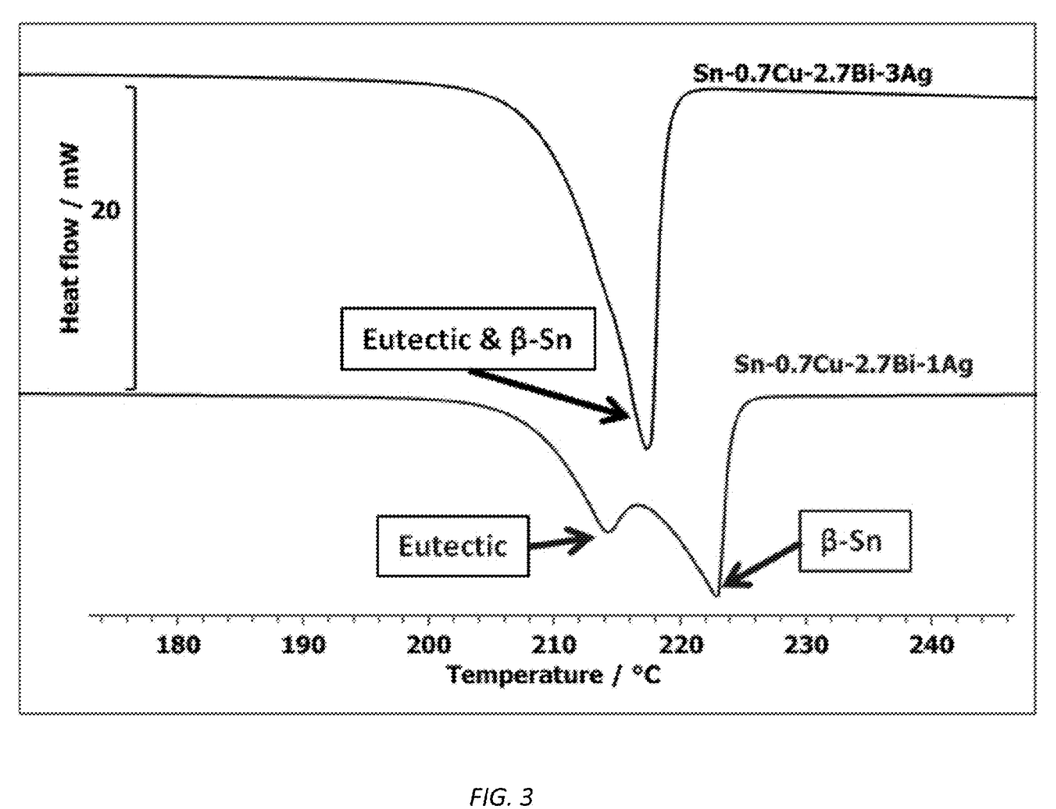
FIG. 3 is a DSC heating curve illustrating two SACB alloys showing the effects of Ag content on melting behavior.

Referring to FIG. 3, Comparison of DSC heating curves of two alloys with different Ag content (1 wt % vs. 3 wt %) shows one endothermic peak for 3% Ag which is separated into two peaks for the alloy with 1 wt % Ag. This indicates that 1 wt % Ag alloy in this study is an off-eutectic alloy with two separated peaks: eutectic and β-Sn.

Figure 4A:
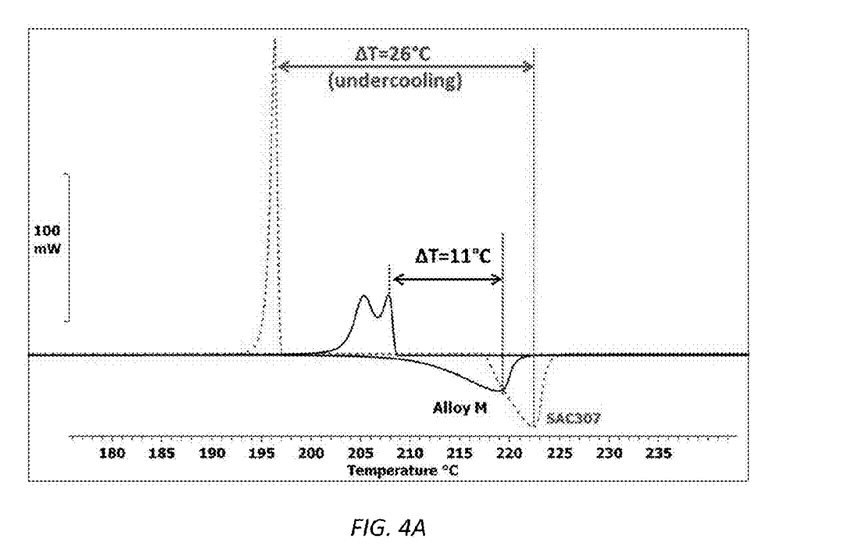
FIG. 4A is a DSC curve of alloy M compared with reference alloy SAC illustrating how microalloying with 900 ppm Ti reduces the undercooling significantly.
Figure 4B:
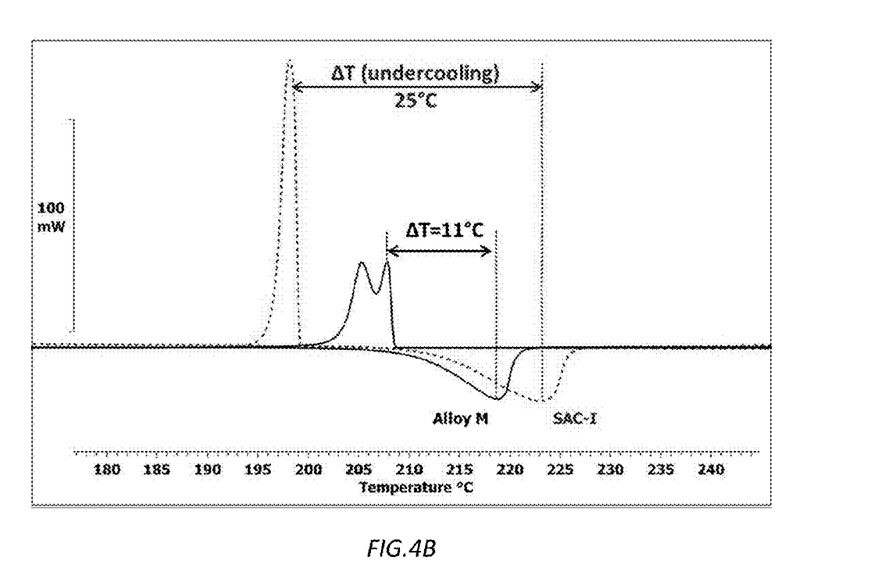
FIG. 4B is a DSC curve of alloy M is compared with reference alloy SAC-I illustrating how microalloying with 900 ppm Ti reduces the undercooling significantly.

Referring the FIGS. 4A and 4B, upon cooling, Ti-added solders show lower undercooling than other alloys. For the solders without Ti (e.g. SAC305 in FIG. 4A and SAC-I in FIG. 4B) the undercooling is significant such that the actual solidification of β-Sn is even lower than the equilibrium freezing temperature of eutectic phase and the solidification of this β-Sn is believed to occur almost simultaneously as the solidification of the eutectic phase.

Figure 5:
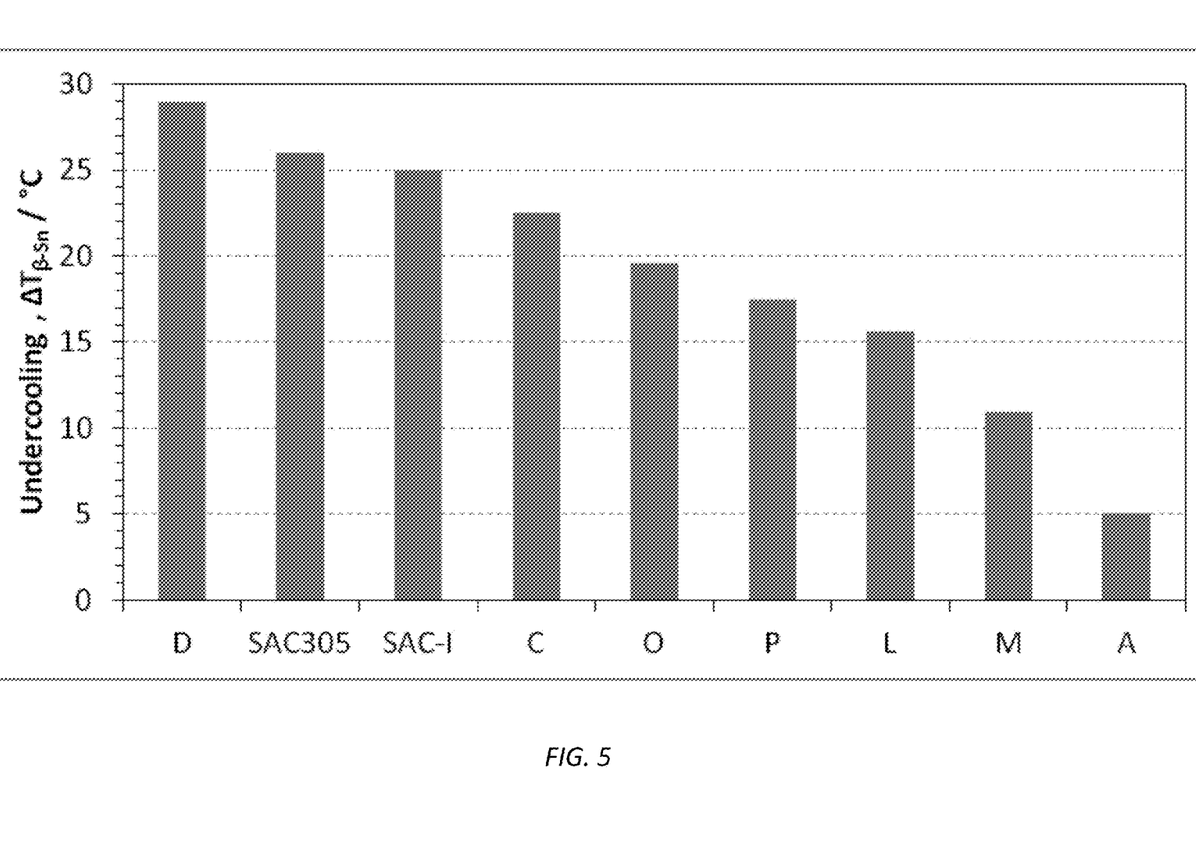
FIG. 5 is a bar chart illustrating solidification range of prior art and experimental solder alloys.

Referring to FIG. 5, the solidification range (undercooling) of the solders are compared. Ti plays a significant role as nucleant and reduces the range of solidification resulting in finer microstructure and intermetallic phase and improves mechanical performance of the solder. The undercooling of the inventive alloy M shows a significant improvement in solidification range when compared with the reference alloys SAC305 and SAC-I.

The hardness of all the specimens was measured by Vickers micro-hardness testing machine with 25 gf load and 15 s impression time. In order to evaluate the effect of high temperature aging on hardness and microstructure evolution the cast samples were also aged at 150° C. for 24 hrs. For each alloy at least five specimens were tested to ensure reproducibility of the tensile and hardness test results.

Figure 6A:
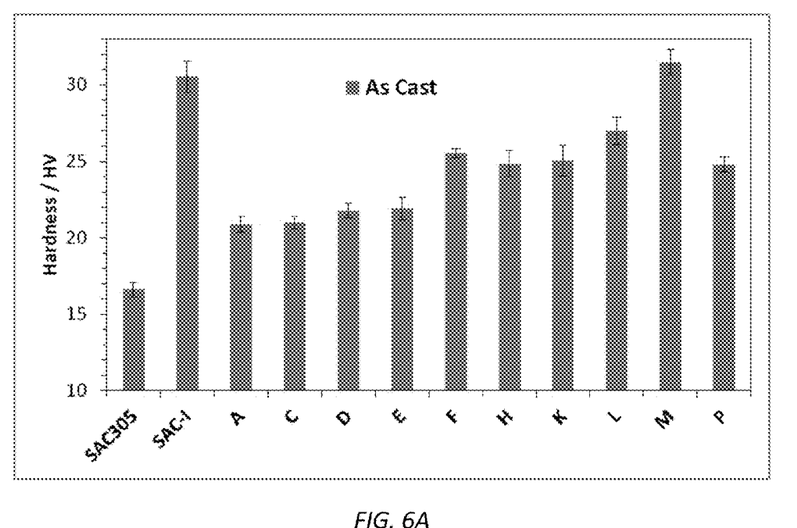
FIG. 6A is a bar chart illustrating hardness of prior art and experimental solder alloys, as-cast, showing how the inventive solder alloy M keeps its hardness if exposed to high temperature.
Figure 6B:
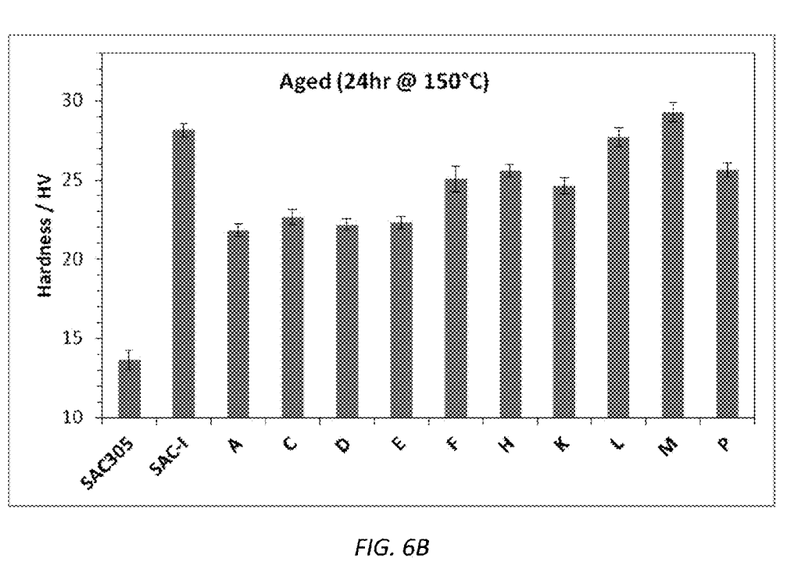
FIG. 6B is a bar chart illustrating hardness of prior art and experimental solder alloys in the (a) as-cast, and (b) aged (24 hrs at 150° C.) conditions. The inventive solder keeps its hardness if exposed to high temperature.

Referring to FIGS. 6A and 6B, the hardness at room temperature in the as cast and aged conditions (24 hrs at 150° C.) show significant improvement. The hardness of alloy M is two times higher than SAC305 and level with SAC-I. Whereas the hardness of SAC305 drops significantly as a result of high temperature aging, the inventive alloy M remains hard even after aging (as shown in FIG. 6B).

Figure 7A:
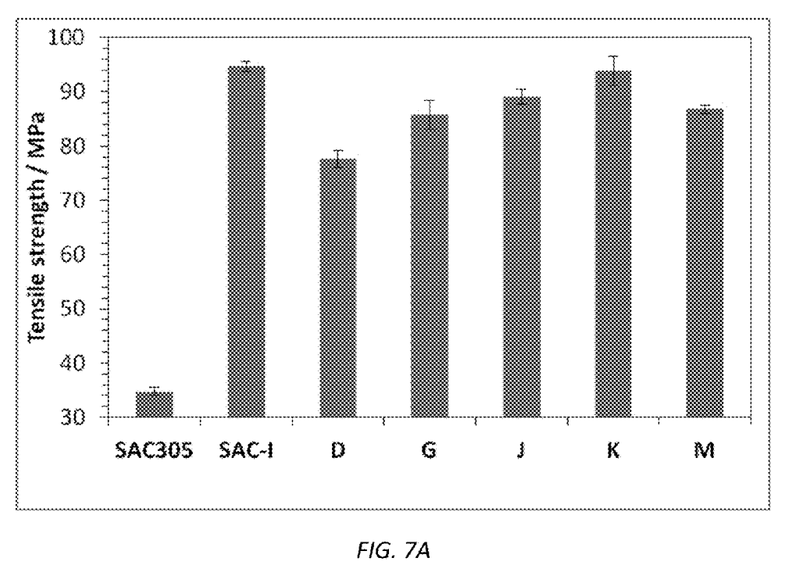
FIG. 7A is a bar chart illustrating tensile strength of the prior art and experimental solder alloys at room temperature, showing how the inventive solder alloy M shows high strength.
Figure 7B:
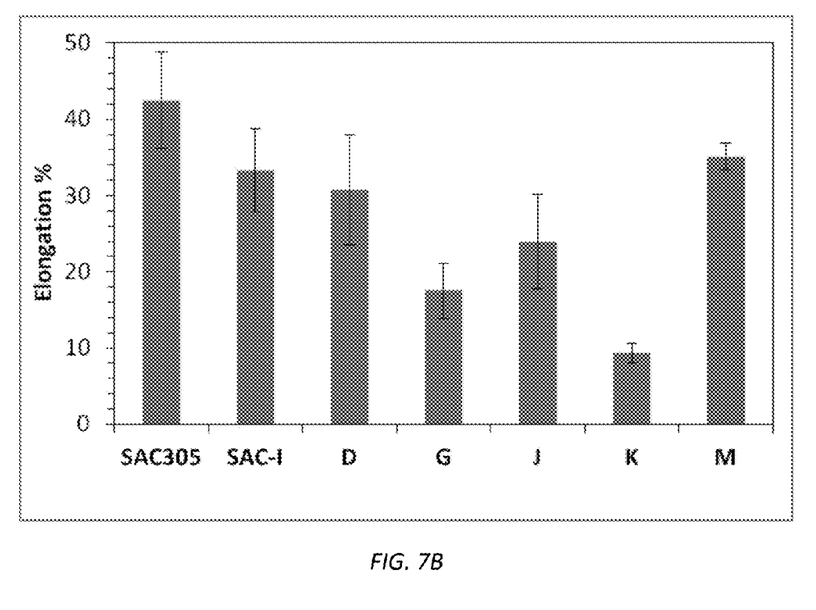
FIG. 7B is a bar chart illustrating elongation of the prior art and experimental solder alloys at room temperature, showing how the inventive solder alloy M shows high formability.

Referring to FIGS. 7A and 7B, the tensile samples were cast into the dog-bone shape stainless steel mold and annealed at 150° C. for 24 hrs to remove any residual stress or inhomogeneity induced during the sample preparation. Tension tests were performed at room temperature and also 100° C. with a constant strain rate of $10^{-3}$ $s^{-1}$.

The tensile strength of inventive alloy M at room temperature shows a significant improvement as compared with SAC305 and is comparable with SAC-I (as shown in FIG. 7A). Alloy M also shows relatively good elongation to fracture (as shown in FIG. 7B).

Figure 8A:
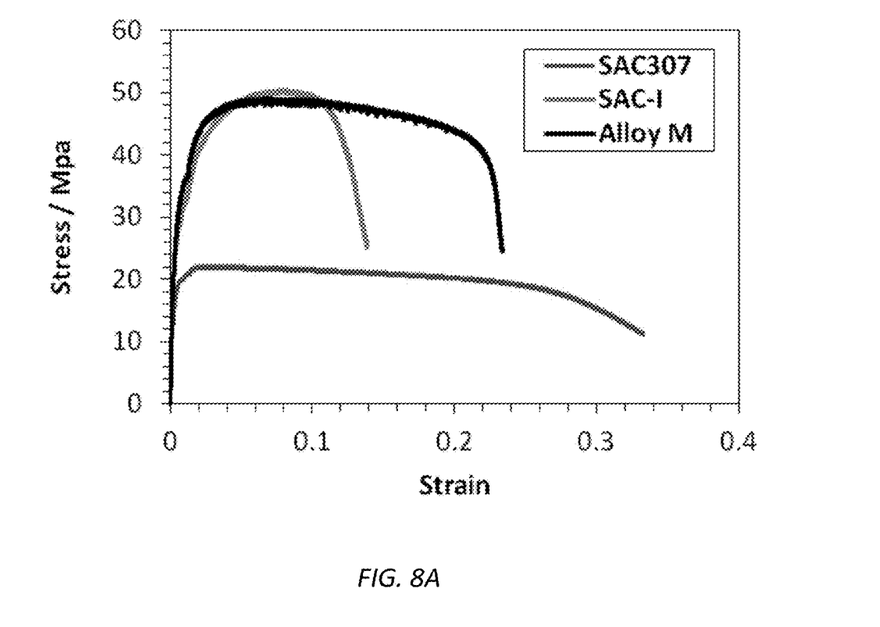
FIG. 8A is a line chart illustrating a stress-strain curve for high temperature (100° C.) tensile properties of inventive alloy M against reference alloys SAC305 and SAC-I.
Figure 8B:
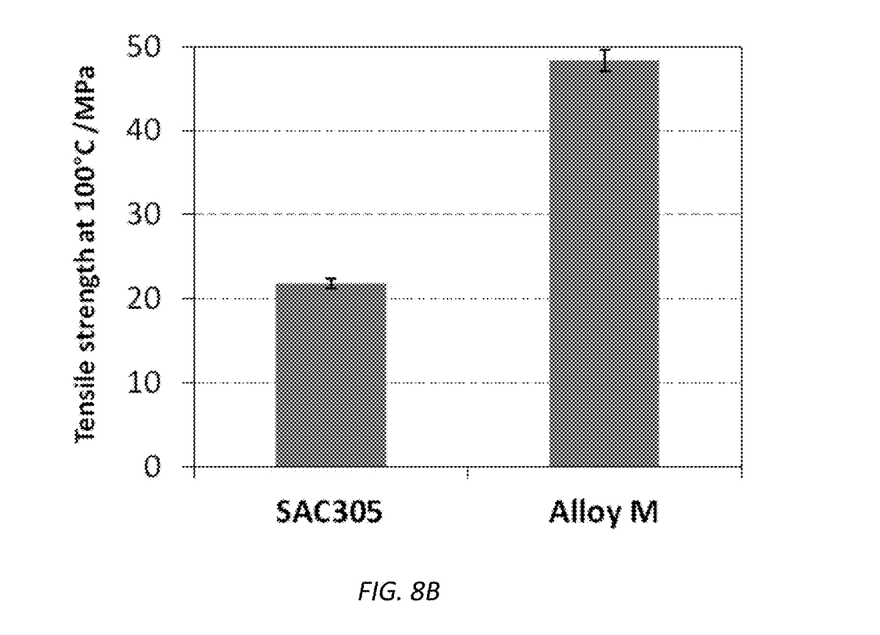
FIG. 8B is a bar chart illustrating a high temperature ultimate tensile strength of alloy M against reference alloy SAC305.

Referring to FIGS. 8A and 8B, the high temperature stress-strain curves at 100° C. shows much higher tensile strength than that of SAC305 and better elongation as compared with SAC-I alloy. The mechanical properties of the inventive solder alloy are superior at low and high temperatures.

Compression creep test samples were first cast into a cylindrical geometry mold with 12.7 mm diameter. The samples were then cut to nominal length of 19 mm. They were then annealed at 150° C. for 24 hrs for homogenization and stress relieving. Compression creep tests were performed with Instron tension-compression test machine at constant stress of 10 MPa and two temperatures: 150° C. and 175° C. At least two samples per condition were tested for each alloy.

Figure 9:
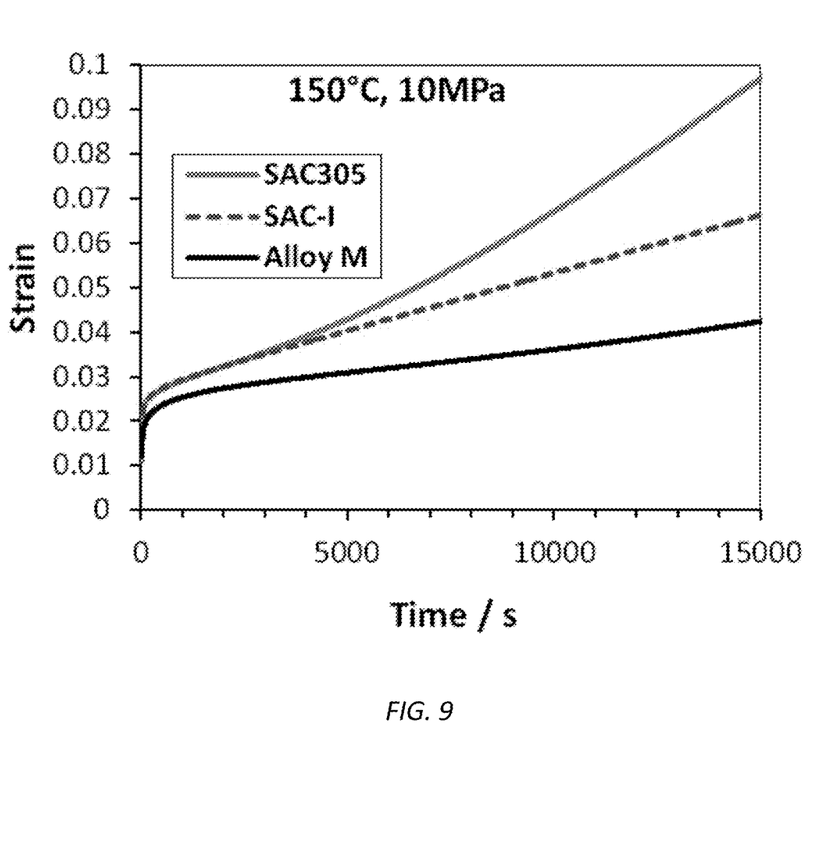
FIG. 9 is a line chart illustrating typical compression creep curves comparing creep strain vs. time for inventive alloy M against reference solder alloys SAC305 and SAC-I at 150° C. and 10 MPa compressive stress.
Figure 10A:
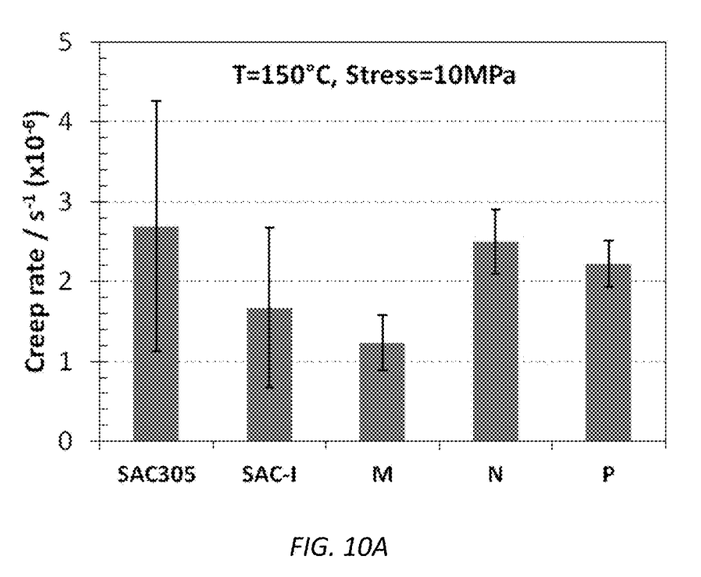
FIG. 10A is a bar chart illustrating compression creep test results at constant load (10 MPa) and T=150° C., comparing inventive solder alloy M against reference alloys.
Figure 10B:
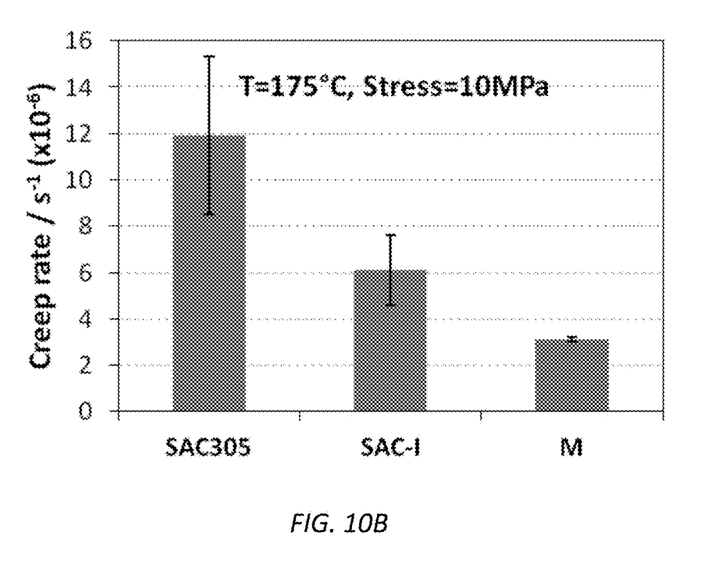
FIG. 10B is a bar chart illustrating compression creep test results at constant load (10 MPa) and T=175° C., comparing inventive solder alloy M against reference alloys.

Referring to FIG. 9, typical compression creep curves show that inventive alloy M deforms at a slower rate as compared with reference alloys. The compression creep strain rates of the alloys (slop of time-strain curves in FIG. 9) at 150° C. and 175° C. are compared in FIGS. 10A and 10B. The improvement in creep resistance of new solder alloy M can be clearly seen in FIGS. 10A and 10B. It is interesting to note that the inventive solder with relatively lower melting temperature can operate at higher temperature with superior creep resistance as compared to the solders with higher melting temperature (e.g. SAC305). Furthermore, the large error bars (standard deviation) of the experimental data seen for SAC305 indicates an unstable microstructure that evolves continuously which impacts its mechanical response. Inventive alloy M with small error bar shows more consistent mechanical response.

The thermal fatigue reliability of the solder alloys was measured per the IPC-9701 specification; −40° C. to +125° C., 5° C.–10° C./min ramp times, 10-15 min dwell at temperature extremes. The test was carried out for a total of 3000 cycles to evaluate thermal fatigue resistance of the inventive alloy against reference alloys. The results showed improved thermal cycle fatigue resistance on leadless (BGA and QFN) surface mount devices for alloy M as compared with SAC305. The presence of micro-alloying element Ti that reduces undercooling and refines subsequent solder microstructure makes the propagation rate of fatigue cracks significantly slower compared with that of alloy SAC-I. Grain refinement significantly enhances fatigue life of solder joint. Therefore, presence of Ti in the inventive alloy M extends the fatigue resistance of previously developed solder alloys.

In order to understand the mechanical behavior of the alloys, the effect of high temperature aging on microstructure evolution of the alloys is examined. The cross section of the solder alloys in the as cast and aged (24 hrs at 150° C.) conditions were prepared using standard metallography procedures. Scanning electron microscope (SEM) with EDS was employed to characterize the microstructure of alloys.

Figure 11A:
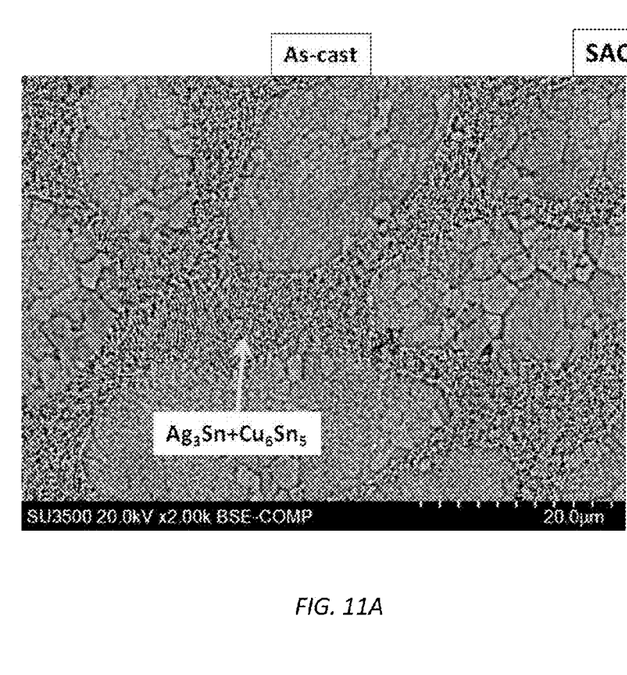
FIG. 11A is a SEM micrograph of reference alloy SAC305, as cast.
Figure 11B:
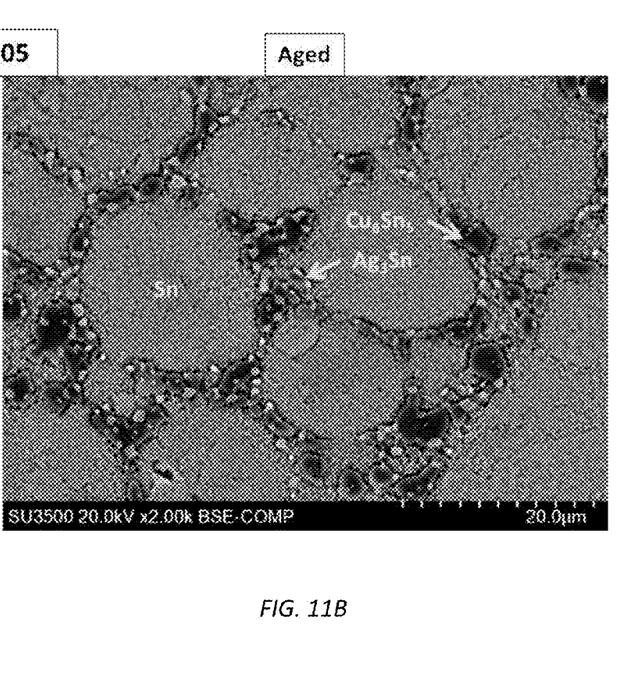
FIG. 11B is a SEM micrograph of reference alloy SAC305, as aged.

Referring to FIGS. 11A and 11B, the cross section of as cast SAC305 reveals fine precipitates of Ag3Sn and Cu6Sn5 in β-Sn matrix. The fine precipitates are responsible for the relatively high strength of SAC305 in as-cast condition (see FIG. 1) due to precipitation strengthening mechanism. However, these particles are coarsened (see FIG. 11B) after heat treatment at high temperature and the alloy becomes weak when expose to high temperature environment.

Figure 11C:
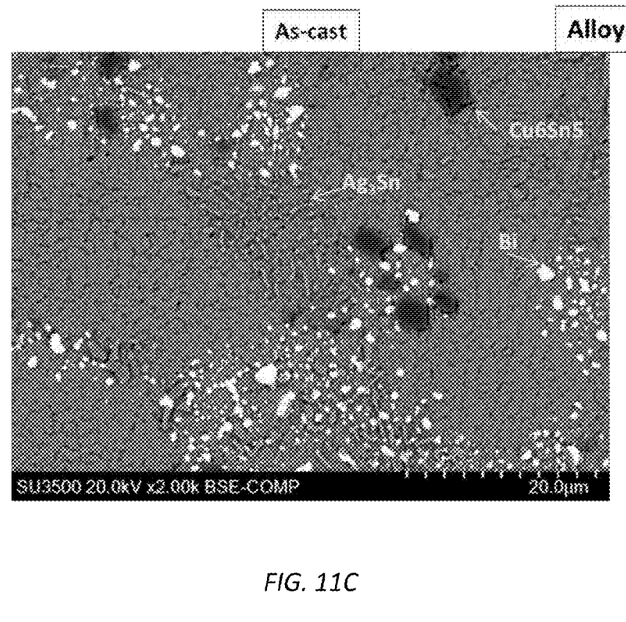
FIG. 11C is a SEM micrograph of inventive alloy M, as cast.
Figure 11D:
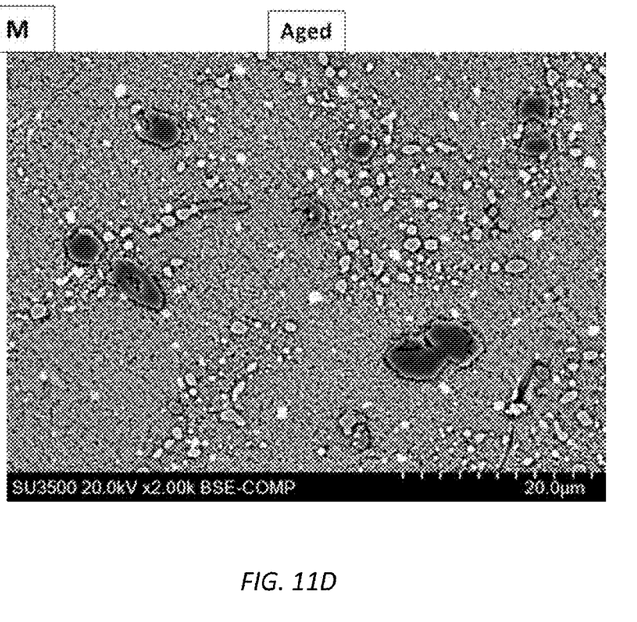
FIG. 11D is a SEM micrograph of inventive alloy M, as aged.

Referring to FIGS. 11C and 11D, the inventive alloy M, on the other hand, reveals a uniform microstructure containing Bi, Ag3Sn and Cu6Sn5 precipitates and Sb dissolved in β-Sn matrix. The presence of finely distributed precipitates even after high temperature aging explains that both solid solution and precipitation strengthening mechanisms are effective for alloy strengthening and stable mechanical performance in harsh environment. The micro-alloying elements of Ti and Ni make the microstructure uniform, fine and stable. Such a microstructure is responsible for the reduced creep rate and high reliability of this alloy.

Figure 12A:
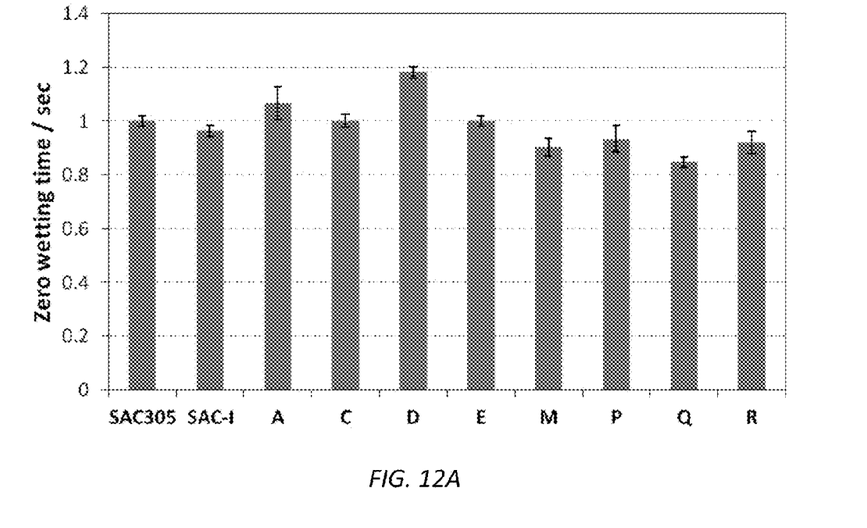
FIG. 12A is a bar chart illustrating wetting balance test results for prior art and experimental alloys performed at T=265° C. using a commercial AIM NC265 liquid flux, wetting cross zero time.
Figure 12B:
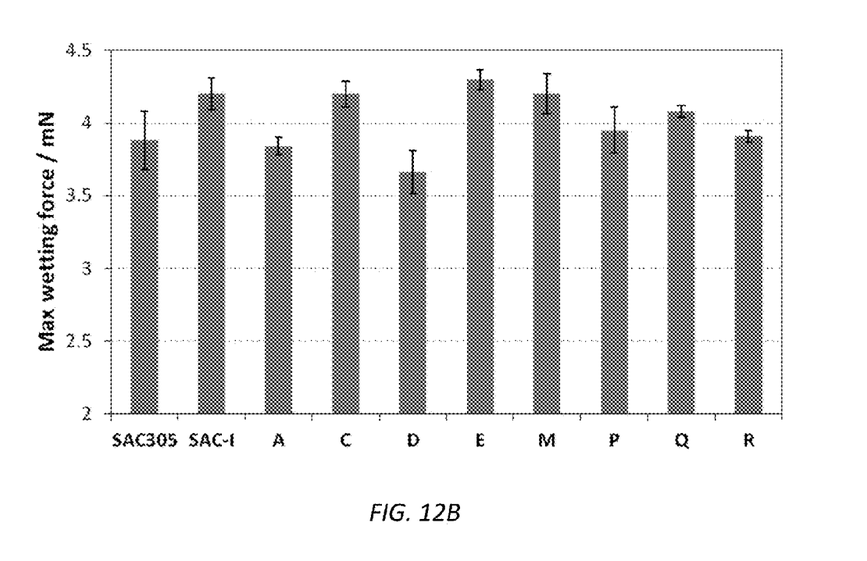
FIG. 12B is a bar chart illustrating wetting balance test results for prior art and experimental alloys performed at T=265° C. using a commercial AIM NC265 liquid flux, at maximum wetting force.

Referring to FIGS. 12A and 12B, solderability is a critical factor when evaluating the performance of a solder alloy. The wetting process is dynamic during soldering and the solid/liquid interfacial tension between solder and substrate varies as the wetting proceeds. Solderability can be quantified with wetting balance technique that measures wetting force between molten solder and solid substrate versus wetting time. Wetting balance test was performed according to IPC-TM-650 (2.4.14.2) test method. Wetting cross zero time ($t_0$) (shown in FIG. 12A) and maximum wetting force ($F_{max}$) (shown in FIG. 12B) are the measure of solderability and wettability of solder alloys. Wetting properties of the present invention, alloy M, are better or comparable to conventional SAC305 and other solder alloys studied.

Figure 13A:
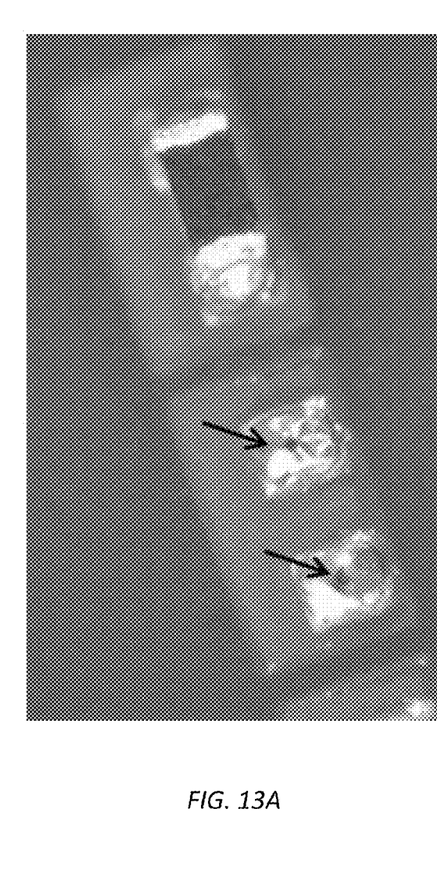
FIG. 13A is a color photograph showing large pimples/blisters generated in the solder joint of a paste made with SAC-I alloy and commercial M8 flux.
Figure 13B:
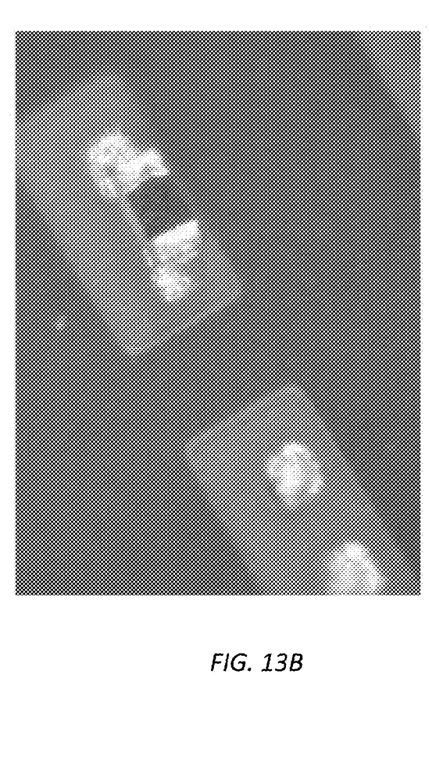
FIG. 13B is a color photograph showing no large voids (or pimples) are detected in the solder joint made with inventive alloy M and commercial M8 flux.

Referring to FIGS. 13A and 13B, one of the difficulties of using available high reliability solder alloys in the market is the voiding issue. For example solder pastes using SAC-I alloy tend to produce more voids in bottom terminated components (BTC) when compared to the same paste flux vehicle used with SAC305 alloy (see FIG. 13A). Moreover, large pimple/blister voids are also commonly seen in the solder joints made with this alloy, however, the new solder alloy M does not show such large pimples in the solder joint made with the same flux (see FIG. 13B).

Figure 14A:
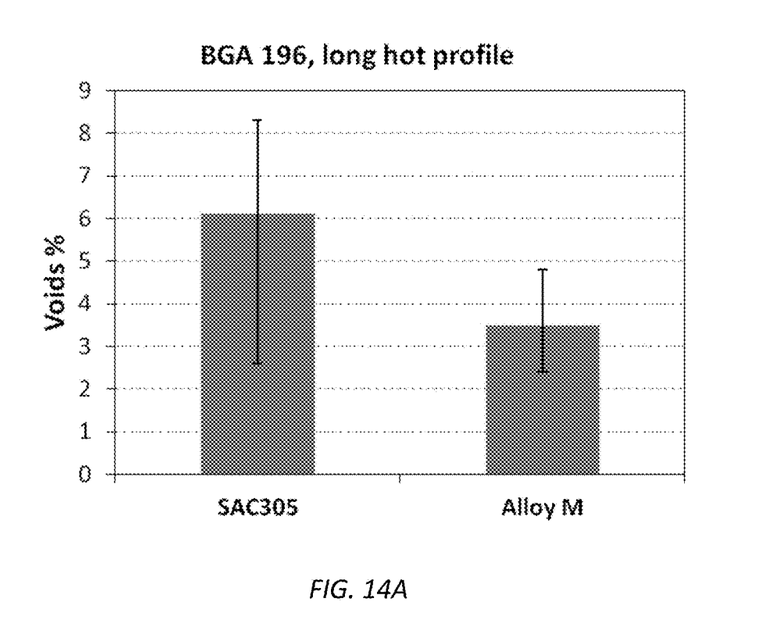
FIG. 14A is a bar chart illustrating average percentages of voiding generated in BTCs soldered with SAC305 and inventive alloy M for BGA 196, long hot profile.
Figure 14B:
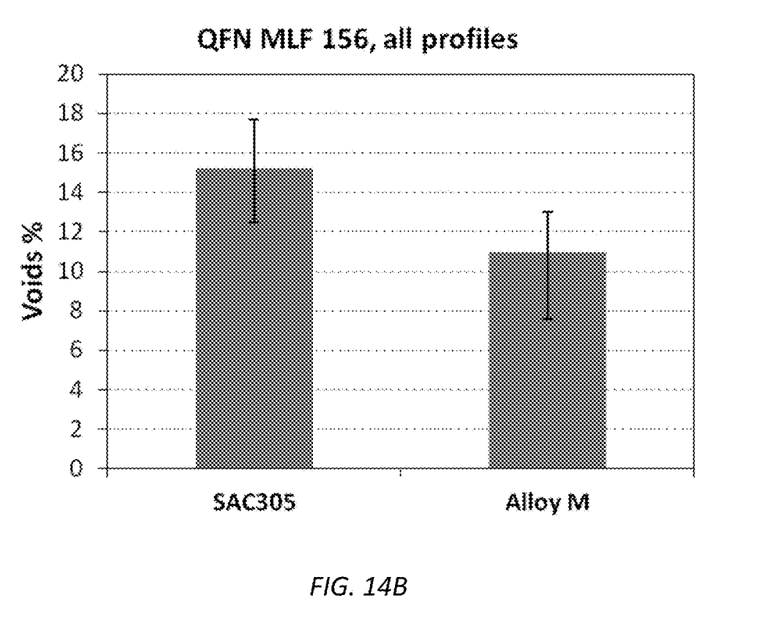
FIG. 14B is a bar chart illustrating average percentages of voiding generated in BTCs soldered with SAC305 and inventive alloy M for QFN MLF 156, all profiles.

Referring to FIGS. 14A and 14B, in order to determine the performance of new alloy in terms of printability and voiding, an extensive investigation was performed on two pastes made with identical flux M8 and two solder alloys SAC305 and new alloy M. Results, as indicated in the bar charts, showed that the new alloy prints very well and generates less voids in BTCs in all short, long and hot reflow profiles.

Tin whisker, a pure tin fiber that grows/extrudes out of tin plating or solder joint has the potential to short circuit electronics. The new lead free alloy also mitigates the whisker growth and offers a reliable solder connection. All lead-free alloys that were tested by the bent wire method exhibit tin whisker growth. This test is a simple coating of copper wire with the molten solder then bending the wire into a U shape. The samples are then placed in 85% RH and 60° C. environment for 1000, 2000 and 3000 hours. At each interval the samples are inspected for tin whisker growth. If whiskers are seen the alloy is considered a risk. Prior to this development only tin/lead based alloys passed. Alloys containing tin, silver and copper (e.g. SAC305) grow the most and longest whiskers. Our tin whisker tests show that some alloy M do not grow whisker after 2000 hr soaking. Mitigated tin whisker growth adds to the reliability of the inventive alloy.

This invention relates to lead-free solder alloy reliable for operation at high temperature. The inventive soldering alloy M comprises Sn as the major constituent, 3% Bi, 3% Ag, 0.7% Cu, 0.6% Sb, 0.05% Ni, 0.01% Ti. The inventive solder alloy composition follows IPC specification that is shown in table 3:

TABLE 3

| | The inventive solder alloy composition (alloy M) | | | | | | |
|---|---|---|---|---|---|---|---|
| Elements | Cu | Ag | Bi | Sb | Ni | Ti | Sn |
| Wt % | 0.6-0.8 | 2.8-3.2 | 2.8-3.2 | 0.5-0.7 | 0.04-0.07 | 0.007-0.015 | Bal. |

The inventive solder alloy has relatively low melting temperature, narrow solidification range and undercooling, high hardness and ultimate tensile strength at room temperature and high temperature, good formability, superior reliability performance such as creep resistance at high temperature, improved thermal cycle fatigue resistance on leadless (BGA and QFN) surface mount devices, stable microstructure at high temperature, very good solderability performance, low voiding in bottom terminated components, and mitigated tin whisker growth as compared with commercial SAC305 and other lead-free solder alloys.

Therefore, it can be seen that the present invention provides a unique solution to the problem of providing a lead-free solder that has high reliability.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A lead-free solder alloy, consisting of:
   about 0.6 to about 0.8 wt % Cu;
   about 2.8 to about 3.2 wt % Ag;
   about 2.8 to about 3.2 wt % Bi;
   about 0.5 to about 0.7 wt % Sb;
   about 0.04 to about 0.07 wt % Ni;
   about 0.007 to about 0.015 wt % Ti; and
   balance Sn.

2. The solder alloy of claim 1, wherein there is about 3 wt % Bi.

3. The solder alloy of claim 1, wherein there is about 3 wt % Ag.

4. The solder alloy of claim 1, wherein there is about 0.7 wt % Cu.

5. The solder alloy of claim 1, wherein there is about 0.6 wt % Sb.

6. The solder alloy of claim 1, wherein there is about 0.05 wt % Ni.

7. The solder alloy of claim 1, wherein there is about 0.01 wt % Ti.

8. A lead-free solder alloy, consisting of about 3 wt % Bi, about 3 wt % Ag, about 0.7 wt % Cu, about 0.6 wt % Sb, about 0.05 wt % Ni, about 0.01 wt % Ti and balance Sn.

9. A lead-free solder alloy, consisting of:
   about 0.6 to about 0.8 wt % Cu;
   about 2.8 to about 3.2 wt % Ag;
   about 2.0 to about 3.0 wt % Bi;
   about 0.5 to about 0.7 wt % Sb;
   about 0.04 to about 0.07 wt % Ni;
   about 0.007 to about 0.015 wt % Ti; and
   balance Sn.

\* \* \* \* \*